United States Patent
Stinchcomb

(10) Patent No.: US 10,843,746 B1
(45) Date of Patent: Nov. 24, 2020

(54) VORTEX DRAG DISRUPTION APPARATUS

(71) Applicant: Joseph Stinchcomb, Greenacres, FL (US)

(72) Inventor: Joseph Stinchcomb, Greenacres, FL (US)

( * ) Notice: Subject to any disclaimer, the term of this patent is extended or adjusted under 35 U.S.C. 154(b) by 0 days.

(21) Appl. No.: 16/298,255

(22) Filed: Mar. 11, 2019

(51) Int. Cl.
*B62D 35/00* (2006.01)
*B62D 37/02* (2006.01)

(52) U.S. Cl.
CPC .......... *B62D 35/00* (2013.01); *B62D 35/001* (2013.01); *B62D 37/02* (2013.01)

(58) Field of Classification Search
CPC ....... B62D 35/001; B62D 37/02; B62D 35/00
USPC ...................................... 296/180.4
See application file for complete search history.

(56) References Cited

U.S. PATENT DOCUMENTS

| | | | |
|---|---|---|---|
| 2,800,291 A | 7/1957 | Stephens | |
| 3,724,892 A | 4/1973 | Ridder | |
| 4,789,117 A | 12/1988 | Paterson | |
| 4,813,633 A | 3/1989 | Werle | |
| 5,058,945 A | 10/1991 | Elliot, Sr. | |
| 5,280,990 A | 1/1994 | Rinard | |
| 5,788,191 A * | 8/1998 | Wake | B64C 27/463 244/199.2 |
| 5,887,280 A * | 3/1999 | Waring | A41D 7/00 2/10 |
| 9,464,532 B2 * | 10/2016 | Sutton | B64C 27/467 |
| 9,682,735 B2 | 6/2017 | Bacon | |
| 9,796,431 B1 * | 10/2017 | Brock | B62D 63/06 |
| 2007/0235590 A1 | 10/2007 | Kokoshkin | |
| 2011/0175395 A1 | 7/2011 | Guigne | |
| 2011/0315248 A1 * | 12/2011 | Simpson | F15D 1/003 137/561 R |
| 2012/0255152 A1 * | 10/2012 | Evans | F15D 1/12 29/426.2 |
| 2013/0076064 A1 | 3/2013 | Smith | |
| 2013/0076068 A1 * | 3/2013 | Wayburn | B62D 35/001 296/180.4 |
| 2013/0106135 A1 * | 5/2013 | Praskovsky | F15D 1/10 296/180.1 |
| 2017/0320527 A1 | 11/2017 | Bacon | |

FOREIGN PATENT DOCUMENTS

EP 0999367 2/2003

* cited by examiner

*Primary Examiner* — Jason S Morrow
(74) *Attorney, Agent, or Firm* — Mark D. Bowen, Esq.; Malin Haley DiMaggio & Bowen, P.A.

(57) ABSTRACT

Vortex disruption apparatus are permanently or removably installed or attached to cargo and passenger vans, busses, box-trucks, tractor-trailer combinations, or any other vehicle to increase transportation efficiency by reducing drag by minimizing the formation of trailing end vortex flow. A plurality of vortex disruption devices is disposed in proximity to the trailing end of a cargo trailer and in adjacently spaced relation whereby they extend away from the vehicle or trailer surface well beyond the fluid dynamic laminar boundary layer formed as the vehicle passes through the air. Once installed the vortex disruption devices disperse the air flowing over the disrupter while allowing air to flow normally through the spaces between the devices. The vortex disruption devices thereby inhibit the natural convergence of airflow and prevent the formation of a low-pressure vortex beyond the trailing edge of the vehicle.

13 Claims, 4 Drawing Sheets

US 10,843,746 B1

VORTEX DRAG DISRUPTION APPARATUS

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally to drag reduction, and more particularly to devices that disrupt the trailing vortex created by the flow of air around a vehicle while traveling.

2. Description of Related Art

The pressure drag vortex formed in the wake of vehicles and particularly the type having non-tapered rear ends, such as tractor-trailers, is known to significantly reduce vehicle efficiency while increasing transportation costs. As air flows from the trailing edge of a non-tapered vehicle or trailer, the air converges into a swirling vortex which produces inherent low pressure drag. This low pressure drag formed at the rear of a trailer, combined with high pressure applied to the front of the vehicle, causes a net pressure differential that generates a force in the opposite direction of travel. The front-to-back pressure differential is the primary source of drag for most large vehicles.

Various attempts have been made to reduce vehicle drag. Such attempts include a host of aerodynamic structures and add-on devices intended to reduce the negative effects created by the low-pressure region formed at the rear of vehicles. For example, U.S. Pat. No. 2,800,291, issued to Stephens, discloses the use of surface mounted apparatus to interact with boundary layer flow. U.S. Pat. No. 3,724,892, issued to Ridder, discloses the use of vortex generators to alter flow over the roof surface of a vehicle. U.S. Pat. No. 5,058,945, issued to Elliott, discloses an aerodynamic bag attachment affixed to the rear of a cargo trailer by straps. U.S. Pat. No. 9,682,735, issued to Bacon, discloses attachment of aerodynamic units to the roof of a road vehicle. The published application to Guigne (US 2011/0175395) discloses a drag reducing device for use with transport vehicles.

The attempts revealed in the background art generally rely on vortex generators intended to function within the confines of boundary layer flow. Such devices differ from vortex disruption devices which are intended to function beyond the surface boundary layer and further to prevent or inhibit the formation of a trailing end vortex behind a moving vehicle. Further, the apparatus disclosed in the background art are burdened by a number of limitations and disadvantages that have prevented widespread acceptance and use. Accordingly, there exists a need for advancements in the transportation field directed to increasing fuel efficiency by disrupting the formation of vortex flow at the rear of large vehicles.

BRIEF SUMMARY OF THE INVENTION

The present invention overcomes the limitations and disadvantages present in the art by providing apparatus designed to disrupt the trailing edge vortex created by the flow of air around a vehicle as it travels down the highway. Vortex disruption apparatus are permanently or removably installed or attached to cargo and passenger vans, busses, box-trucks, tractor-trailer combinations, or any other vehicle. Trailing edge vortex disruption is achieved by use of a plurality of vortex disruption devices positioned in proximity to the trailing end of a vehicle or trailer. The vortex disruption devices are disposed in adjacently spaced relation and extend away from the vehicle or trailer surface well beyond the fluid dynamic laminar boundary layer formed as the vehicle passes through the air. The boundary layer is that fluid layer which has its velocity affected by the boundary shear. Once installed the vortex disruption devices disperse the air flowing over the disrupter while allowing air to flow normally through the spaces between the devices. The vortex disruption devices thereby inhibit the natural convergence of airflow and prevent the formation of a low-pressure vortex beyond the trailing edge of the vehicle.

In a first embodiment, a plurality of fixed vortex disruption devices are secured in spaced relation with the trailing edge of the trailer and secured using a strap. Each fixed vortex disruption device comprises a generally triangular structure having a leading end and a trailing end. Left-hand and right-hand planar surfaces are disposed in diverging and inwardly slanted relation wherein they join along a common upper edge which increases in height from the leading end to the trailing end. When used with the trailer of a tractor-trailer rig, the vortex disruption devices are preferably 12.0 inches long, and when measured at the trailing end, 12.0 inches wide and 6.0 inches tall. In a second embodiment, mechanically actuated vortex disruption devices are provided which are configurable between a generally flat stowed configuration and a functional, outwardly projecting deployed configuration.

Accordingly, it is an object of the present invention to reduce transportation costs by increasing vehicle fuel efficiency via drag minimization.

It is another object of the present invention to provide apparatus that reduce vortex drag at the rear of a vehicle.

Still another object of the present invention it to provide vortex disruption apparatus for minimizing vehicle drag.

Yet another object of the present invention is to provide such vortex disruption apparatus that is easy to install and uninstall.

Still another object of the present invention is to provide a vortex disruption system for vehicles that is mechanically deployed for use at desired speeds.

These and other objects are met by the present invention which will become more apparent from the accompanying drawing and the following detailed description of the drawings and preferred embodiments.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
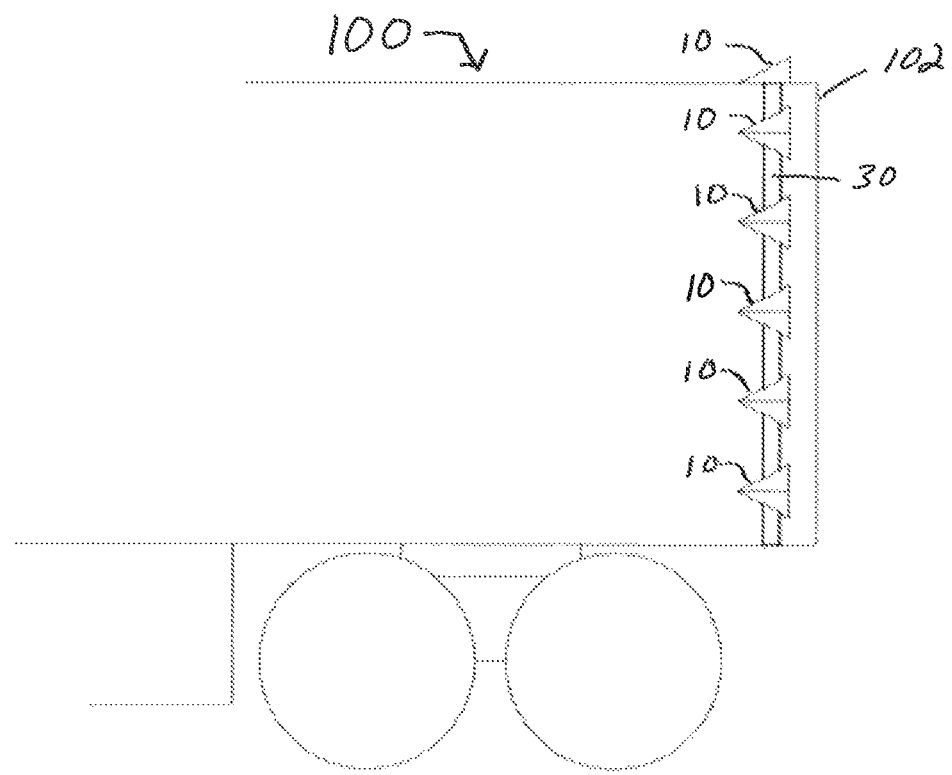
FIG. 1 is a partial side view of a trailer adapted with vortex disruption apparatus in accordance with the present invention.
Figure 2:
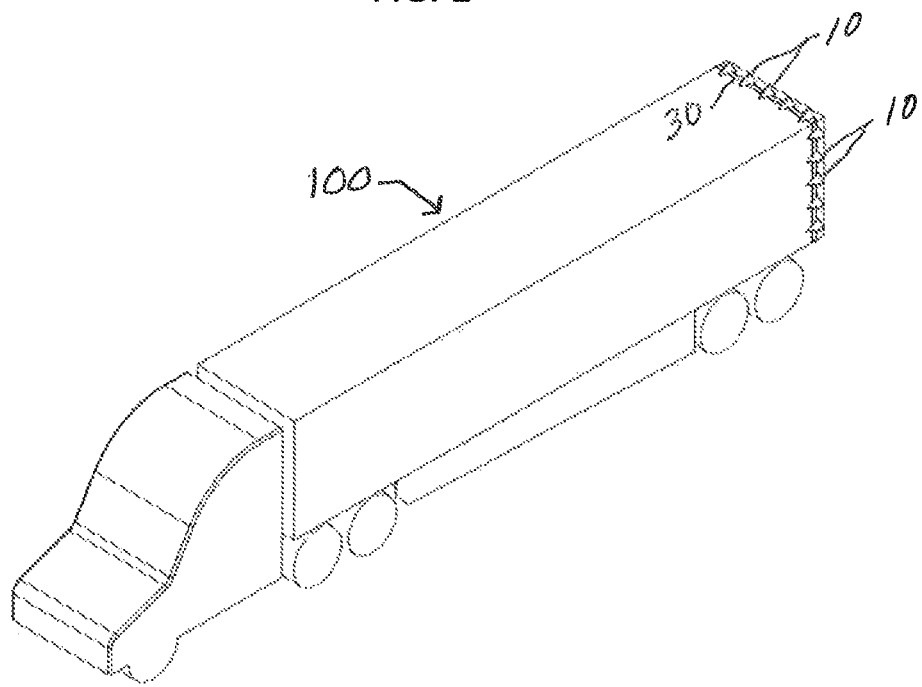
FIG. 2 is a perspective view thereof.
Figure 3:
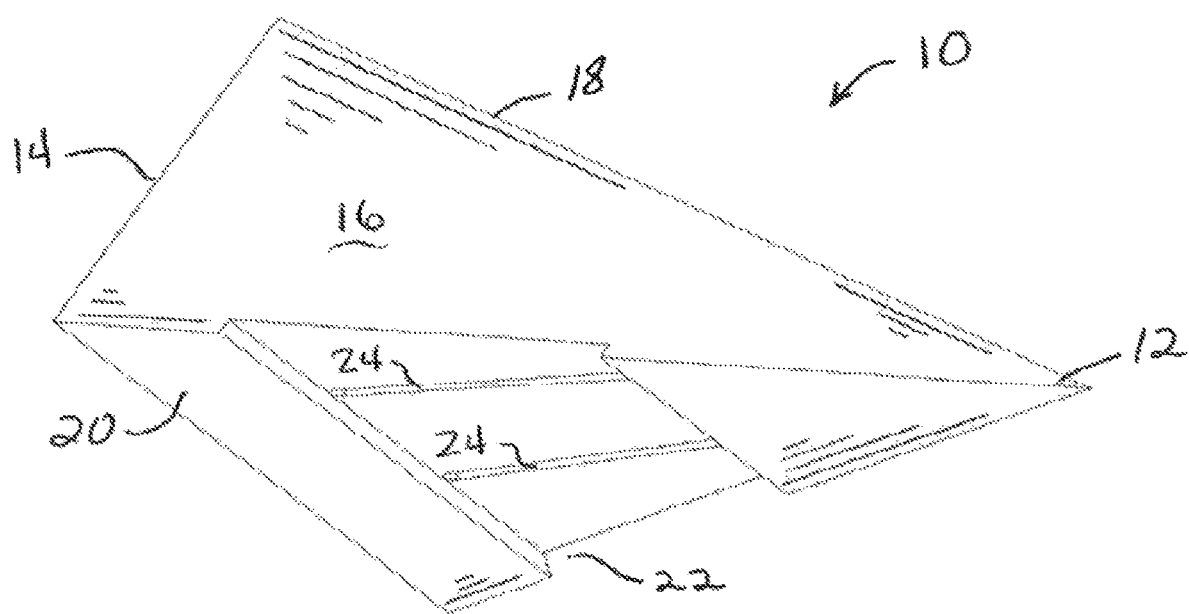
FIG. 3 is a bottom perspective view of a vortex disruption device.
Figure 4:
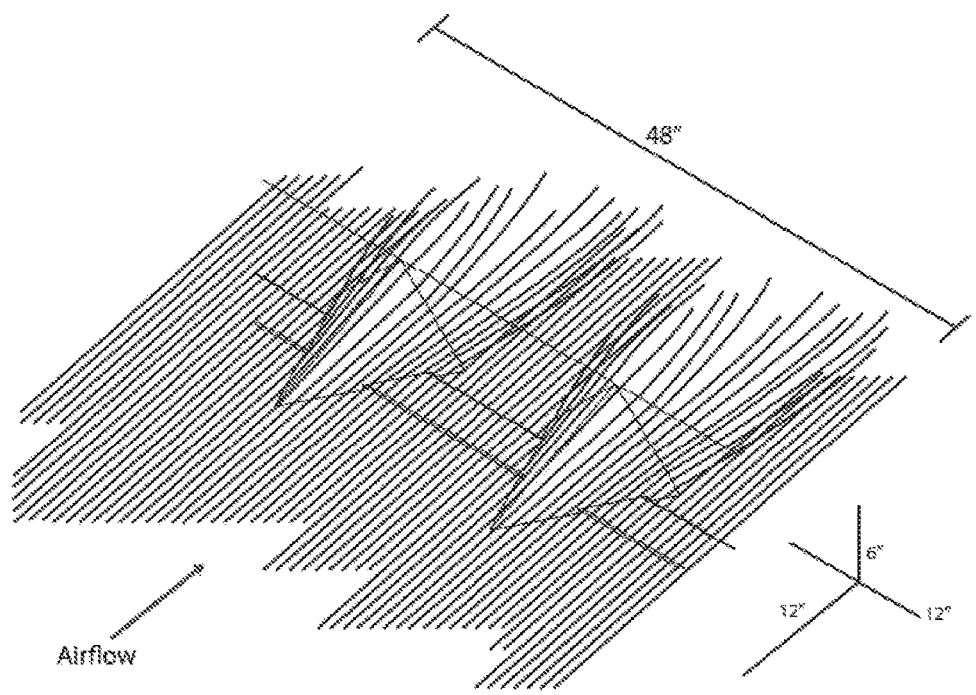
FIG. 4 illustrates airflow streamlines flowing over vortex disruption apparatus of the present invention.
Figure 5:
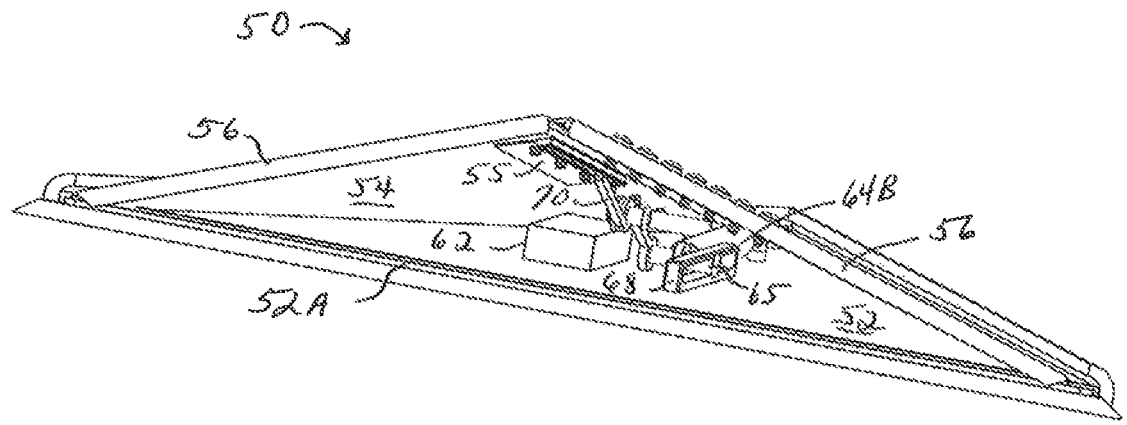
FIG. 5 is a rear perspective view of a mechanically actuated embodiment partially deployed.
Figure 6:
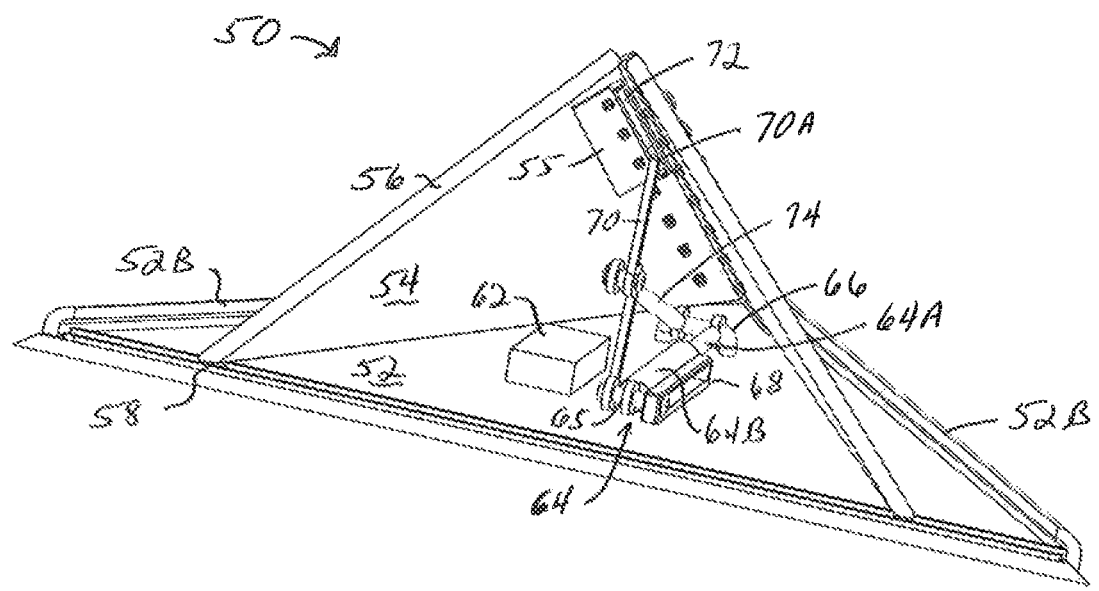
FIG. 6 is a rear perspective view thereof fully deployed.
Figure 7:
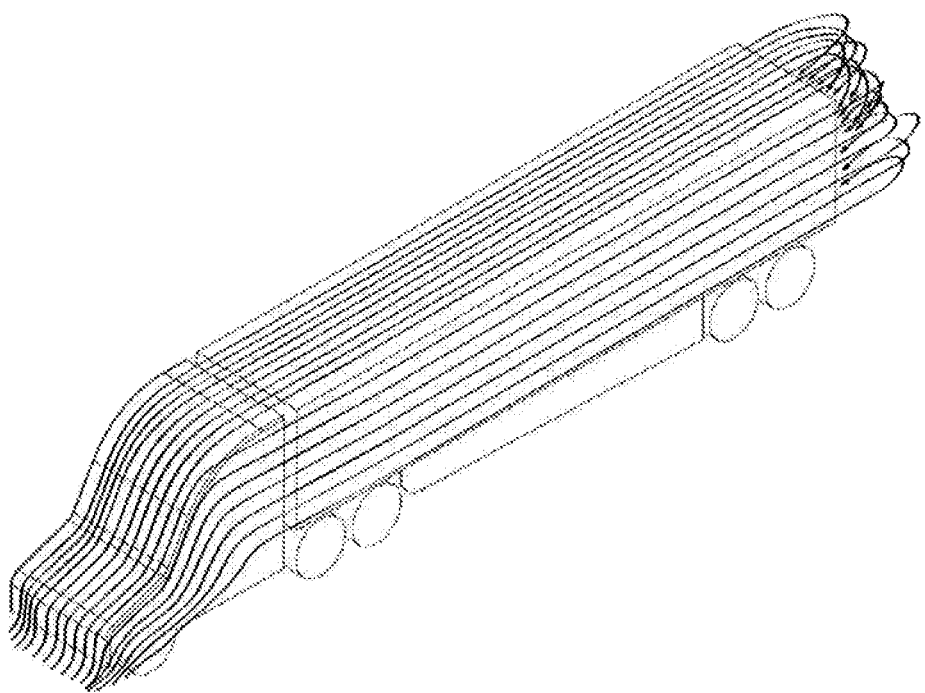
FIG. 7 is a computer model illustration of air flow streamlines creating a trailing edge vortex as they pass around a conventional tractor trailer.

Turning now to the drawings, FIGS. 1-8, apparatus designed to disrupt the trailing edge vortex created by the flow of air around a vehicle as it travels at highway speed in accordance with the present invention are disclosed. In accordance with the present invention, vortex disruption apparatus are permanently or removably installed or attached to cargo and passenger vans, busses, box-trucks, tractor-trailer combinations, or any other vehicle. As best seen in FIGS. 1 and 2, trailing edge vortex disruption is achieved by use of a plurality of vortex disruption devices 10 positioned in proximity to the trailing edge or end 102 of a vehicle or trailer, referenced as 100. Vortex disruption devices 10 are disposed in adjacently spaced relation and extend away from the vehicle or trailer surface well beyond the boundary layer. Once installed the vortex disruption devices 10 disperse the air flowing over and around each device while allowing air to flow normally through the spaces between the devices as illustrated in FIG. 4. The vortex disruption devices thereby inhibit the otherwise natural convergence of airflow and prevent to formation of a low-pressure vortex beyond the trailing edge of the vehicle as seen in FIG. 7 (vortex created behind trailer without vortex disruption devices) and FIG. 8 (significantly reduced vortex created behind trailer adapted with vortex disruption devices).

In a first embodiment, shown in FIGS. 1-4, a plurality of fixed vortex disruption devices 10 are secured in spaced relation with the trailing edge 102 of trailer 100. The vortex devices are secured to the trailer using a strap 30. Strap 30 preferably comprises a flat elongated strap body having connectable ends, preferably adapted with a ratchet mechanism (not shown) to allow for sufficient tightening as is known in the art of ratchet straps. Each fixed vortex disruption device 10 comprises a generally triangular structure having a leading end, generally referenced as 12, and a trailing end, generally referenced as 14. Left-hand and right-hand planar surfaces, each referenced as 16, originate at the extreme leading end 12, and are disposed in diverging and inwardly slanted relation wherein they join along a common upper edge 18. Common upper edge 18 originates at the extreme leading end 12 and increases in height as it extends longitudinally rearward from leading end 12 to an open trailing end 14. In a preferred embodiment the trailing end 14 terminates within a plane that is perpendicular to the vehicle surface upon which the device is mounted. Each vortex device further includes a bottom 20 which defines a generally acute triangular perimeter shaped in the form of an isosceles triangle wherein the smallest angle is formed at the leading end. Bottom 20 further defines a strap receiving recess 22 extending transversely across the bottom, and a pair of slotted apertures 24 for receiving strap 30 threadedly disposed therethrough. A plurality of vortex disruption devices 10 may thus be affixed to a vehicle using a fastening apparatus, such as a single strap 30 as illustrated in FIGS. 1 and 2. While a strap is disclosed in a first embodiment fastening apparatus for removably securing the vortex devices to the vehicle, alternate fastening apparatus and methods of removable or permanent fixation, including the use of adhesive, magnetic attachment, and/or mechanical fasteners, are considered within the scope of the present invention. The vortex devices are preferably fabricated from foam, fabric, composite material, plastic material, an inflated structure, metal, or any suitable material or structure within the scope of the invention. In addition, the vortex disruption devices may include illumination or lighting systems, such as LED lighting for safety and or area illumination.

As further illustrated in FIG. 4, when used with the trailer of a tractor-trailer rig, the vortex disruption devices 10 are preferably 12.0 inches long, and when measured at the trailing end, 12.0 inches wide and 6.0 inches tall. It is important that the vortex disruption devices are sized with a height that is sufficient so as to extend well below the boundary layer. When used in a tractor trailer application, it has been found that 6.0 inches is sufficient as the boundary layer does not extend to that height. It should be noted, however, that variations in the disclosed dimensions for the same or other applications remain within the contemplated scope of the present invention. In addition, the vortex disruption devices are installed with the trailing ends thereof spaced from the trailing edge 102 of trailer 100. When used in a tractor trailer application, it has been found that a 6.0 inch spacing between the trailing end of the vortex disruptor and the trailing end of the trailer is sufficient. It should be noted, however, that variations in the disclosed dimensions for the same or other applications remain within the contemplated scope of the present invention.

FIGS. 5 and 6 illustrate a mechanically actuated vortex disruption device, generally referenced as 50, in accordance with an alternate embodiment of the present invention. FIG.

5 depicts the mechanically actuated vortex disruption device 50 in a partially deployed configuration, and FIG. 6 depicts the device in a fully deployed configuration. As should be apparent, vortex disruption device 50 may also assume a retracted or non-deployed configuration wherein the device is substantially flat as seen in FIG. 5. Actuation of mechanically actuated device 50 may be manual, electric, hydraulic, mechanical, pneumatic, or any other suitable actuation structure or system.

Each mechanically actuated vortex disruption device 50 includes a base frame 52 and a pair of left-hand and right-hand diffractor plates, each referenced as 54. Diffractor plates 54 are connected along adjacent edges thereof by a hinge connection, 55 which allows for pivotal movement along the central upper edge of plates 54. Further, each diffractor plate has a trailing end 56 with a lower portion thereof, referenced 58, adapted for slidable mating engagement with a corresponding trailing end 52A of base frame 52. Base frame 52 further includes opposing side edges defining an upwardly projecting and inwardly curved lip 52B which functions to receive corresponding outer edge portions of diffractor plates 52 when device 50 is configured in the non-deployed configuration.

As illustrated in FIGS. 5 and 6, each mechanically actuated vortex disruption device 50 is actuated via an actuation system, generally referenced as 60, including a control module 62. Control module 62 may receive an input signal from any suitable source including user switch activation, vehicle speed etc. and convert any such input into an output command for deployment and retraction of vortex disruption device 50. In one embodiment, the actuation system includes a linear actuator 64 having an actuating member 64A coupled to an anchor structure 66, and an actuating tube 64B having an end thereof adapted with a dowel 65 in sliding engagement with a track 68. Dowel 65 is further connected to a rigid member 70 having a terminal end thereof 70A received within a second track 72 connected to hinge 54. A rod 74 has a first end 74A pivotally connected to anchor structure 66, and a second end 74B pivotally connected to rigid member 70 as shown in FIGS. 5 and 6. An actuation signal from control module 62 activates linear actuator 64 whereby extension of actuating member 64A causes the actuating tube 64B to slide rearward such that dowel 65 slides rearward within track 68. This movement moves rigid member 70 to a generally vertical position whereby the terminal end 70A of rigid member 70 slides within track 72 thereby resulting in raised deployment of vortex disruption device 50. As noted above, linear actuator 64 may be electric, hydraulic, or any other suitable actuating mechanism. Further, other actuating mechanisms and linkages may be substituted for those disclosed to deploy and retract vortex disrupter devices 50.

Figure 8:
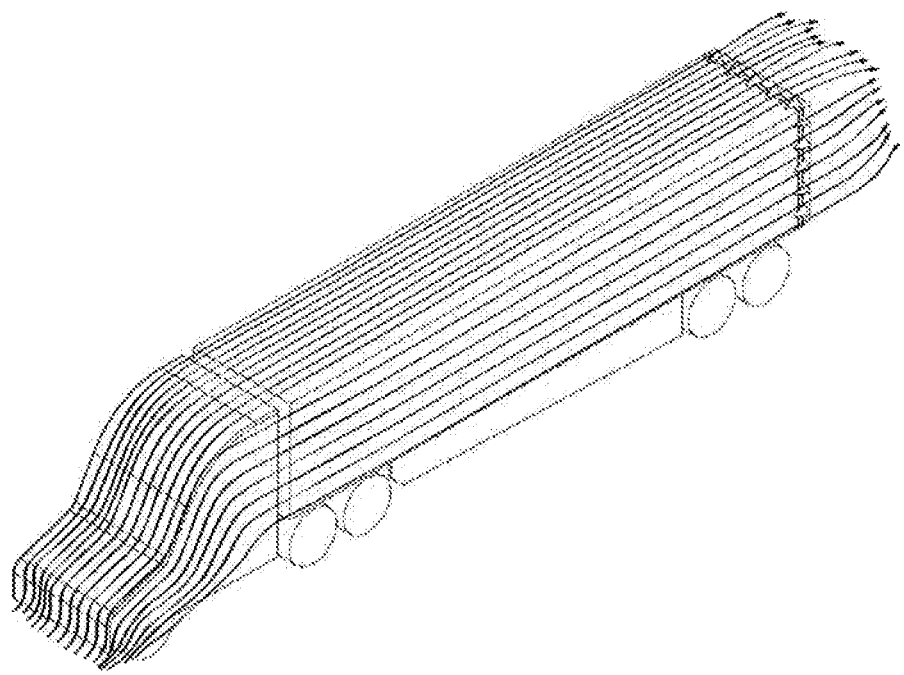
FIG. 8 is a computer model illustration of air flow streamlines passing around a tractor trailer adapted with vortex disruption devices in accordance with the present invention.

Turning now to FIGS. 7 and 8, the vortex disrupter devices disclosed herein have been found to be effective in inhibiting the formation of vortex induced drag. FIG. 7 illustrates streamlines illustrative of air flowing over a moving tractor trailer combination. What is most significant in the context of the present invention is the region directly behind the trailer wherein a low-pressure region and associated vortex flow. FIG. 8 depicts streamlines consistent with air flowing over a moving tractor trailer combination adapted with vortex disruption devices in accordance with the present invention. As shown in FIG. 8, the vortex disruption devices of the present invention alter the fluid dynamic flow in the region behind the trailer to minimize the formation of a low-pressure region and associated vortex generation. By minimizing the low pressure vortex generation behind the vehicle, drag is reduced and fuel efficiency is increased.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A vortex disruption system for vehicles having opposing sides, a roof, and terminating at a rear end, said apparatus comprising:
   a plurality of vortex disruption devices adapted to be mounted to the sides and/or roof of the vehicle, and in spaced relation with the vehicle rear end;
   each vortex disruption device includes a leading end, a trailing end, and a bottom defining an isosceles triangular-shaped perimeter;
   said trailing end of each of said plurality of vortex disruption devices extends beyond the fluid dynamic boundary layer formed as the vehicle moves through the air;
   a left-hand planar surface and a right-hand planar surface, said planar surfaces originating at said leading end, and extending therefrom in diverging and inwardly slanted relation wherein said planar surfaces join along a common upper edge; and
   fastening apparatus affixing said vortex disruption devices to the vehicle.

2. The vortex disruption system according to claim 1, wherein the bottom of each of said plurality of vortex disruption devices defines a recess extending transversely across the bottom, and a pair of slotted apertures.

3. The vortex disruption system according to claim 2, wherein said fastening apparatus includes a strap threadedly disposed through said slotted apertures.

4. The vortex disruption system according to claim 1, wherein said left-hand planar surface and said right-hand planar surface of each vortex disruption device are pivotally connected and configurable between a deployed configuration, and a non-deployed configuration wherein said left-hand planar surface and said right-hand planar surface are disposed within the same plane.

5. The vortex disruption system according to claim 4, further including an actuation system for configuring said vortex disruption device between said deployed and non-deployed configuration.

6. A vortex disruption system for vehicles having opposing sides, a roof, and terminating at a rear end, said apparatus comprising:
   a plurality of vortex disruption devices mounted to the sides and roof of the vehicle, and in spaced relation with the vehicle rear end;
   each vortex disruption device includes a leading end, a trailing open end, and a bottom, said bottom defining a perimeter that tapers outwardly from said leading end to said trailing end, wherein at least said trailing end of each of said plurality of vortex disruption devices extends beyond the fluid dynamic boundary layer formed as the vehicle moves through the air; and
   a left-hand planar surface and a right-hand planar surface, said planar surfaces originating at said leading end, extending therefrom with lower edges thereof diverging relative to one another, each of said surfaces slanting inwardly wherein top edges thereof join along a common upper edge.

7. The vortex disruption system according to claim 6, wherein the bottom of each of said plurality of vortex disruption devices defines a recess extending transversely across the bottom, and a pair of slotted apertures.

8. The vortex disruption system according to claim 7, wherein said fastening apparatus includes a strap threadedly disposed through said slotted apertures.

9. The vortex disruption system according to claim 6, wherein said left-hand planar surface and said right-hand planar surface of each vortex disruption device are pivotally connected and configurable between a deployed configuration, and a non-deployed configuration wherein said left-hand planar surface and said right-hand planar surface are disposed within the same plane.

10. The vortex disruption system according to claim 9, further including an actuation system for configuring said vortex disruption device between said deployed and non-deployed configuration.

11. A vortex disruption system for vehicles having opposing sides, a roof, and terminating at a rear end, said apparatus comprising:

a plurality of vortex disruption devices;

each vortex disruption device includes a leading end, a trailing end, and a bottom defining a triangular-shaped perimeter;

wherein a portion of each of said plurality of vortex disruption devices extends beyond the fluid dynamic boundary layer formed as the vehicle moves through the air;

a left-hand planar surface and a right-hand planar surface, said planar surfaces originating at said leading end, and extending therefrom in diverging and inwardly slanted relation wherein said planar surfaces join along a common upper edge; and fastening apparatus affixing said vortex disruption devices to the vehicle in spaced relation with the vehicle rear end.

12. The vortex disruption system according to claim 11, wherein a plurality of vortex disruption devices are affixed to the sides of the vehicle.

13. The vortex disruption system according to claim 11, wherein a plurality of vortex disruption devices affixed to the top of the vehicle.

* * * * *